US008775935B2

(12) United States Patent
Butcher

(10) Patent No.: US 8,775,935 B2
(45) Date of Patent: Jul. 8, 2014

(54) PERSONIFICATION OF SOFTWARE AGENTS

(75) Inventor: Thomas C. Butcher, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 680 days.

(21) Appl. No.: 12/629,499

(22) Filed: Dec. 2, 2009

(65) Prior Publication Data

US 2011/0131507 A1 Jun. 2, 2011

(51) Int. Cl.
*G06F 3/048* (2013.01)
*G06F 3/00* (2006.01)

(52) U.S. Cl.
USPC .......................................... 715/706; 715/751

(58) Field of Classification Search
CPC ................... G06F 3/048; G06F 3/00
USPC .................................. 715/706, 751
See application file for complete search history.

(56) References Cited

U.S. PATENT DOCUMENTS

| | | | | |
|---|---|---|---|---|
| 6,067,568 | A * | 5/2000 | Li et al. | 709/223 |
| 7,926,029 | B1 * | 4/2011 | Stoyen et al. | 717/117 |
| 7,949,752 | B2 * | 5/2011 | Lange et al. | 709/226 |
| 8,005,832 | B2 * | 8/2011 | Andrieu | 707/731 |
| 8,238,891 | B1 * | 8/2012 | Tam et al. | 455/418 |
| 2004/0030741 | A1 * | 2/2004 | Wolton et al. | 709/202 |
| 2006/0026227 | A1 * | 2/2006 | Shaughnessy et al. | 709/202 |
| 2007/0220552 | A1 | 9/2007 | Juster et al. | |
| 2008/0016205 | A1 | 1/2008 | Svendsen | |
| 2008/0092058 | A1 * | 4/2008 | Afergan et al. | 715/745 |
| 2008/0132252 | A1 * | 6/2008 | Altman et al. | 455/457 |
| 2009/0055377 | A1 | 2/2009 | Hedge et al. | |
| 2009/0132520 | A1 | 5/2009 | Nemeth et al. | |
| 2009/0148124 | A1 * | 6/2009 | Athsani et al. | 386/46 |
| 2009/0157795 | A1 | 6/2009 | Black | |
| 2009/0164199 | A1 | 6/2009 | Amidon et al. | |
| 2009/0164641 | A1 | 6/2009 | Rogers et al. | |
| 2009/0198622 | A1 * | 8/2009 | Temte et al. | 705/80 |
| 2009/0222551 | A1 * | 9/2009 | Neely et al. | 709/224 |
| 2009/0233624 | A1 * | 9/2009 | Lee | 455/456.3 |
| 2010/0211994 | A1 * | 8/2010 | Yamaguchi | 726/3 |
| 2010/0318422 | A1 * | 12/2010 | Kim et al. | 705/14.53 |

OTHER PUBLICATIONS

Hung, et al., "Tag-Based User Profiling for Social Media Recommendation—Published Date: 2008", Retrieved at <<http://clover.csie.org/~janetyc/publication/Hung2008.pdf>>, Association for the Advancement of Artificial Intelligence (www.aaai.org), 2008, pp. 7.

* cited by examiner

*Primary Examiner* — Doon Chow
*Assistant Examiner* — Le Nguyen
(74) *Attorney, Agent, or Firm* — Bryan Webster; Andrew Sanders; Micky Minhas

(57) ABSTRACT

Personification techniques for software agents are described. In an implementation, a plurality of software agents is personified in a user interface to be selectable as friends in a social network service. Each of the software agents is executable to make one or more recommendations based on criteria of the software agent, respectively. Recommendations made by particular software agents are communicated via user accounts of the social network service that have selected the particular software agents as friends.

20 Claims, 6 Drawing Sheets

PERSONIFICATION OF SOFTWARE AGENTS

BACKGROUND

Conventional techniques that are employed to recommend content to consumers typically employ an "all-in-one" approach that leaves little room for the consumer to customize how the system generates the recommendations. These conventional techniques also typically fail to consider that the user may have different media consumption modalities. One result of these shortcomings is that the consumer often discounts the recommendations made using these conventional techniques, limiting the intended effect and utility of the techniques.

SUMMARY

Personification techniques for software agents are described. In an implementation, a plurality of software agents is personified in a user interface to be selectable as friends in a social network service. Each of the software agents is executable to make one or more recommendations based on criteria of the software agent, respectively. Recommendations made by particular software agents are communicated via user accounts of the social network service that have selected the particular software agents as friends.

In an implementation, one or more tangible computer-readable media comprise instructions stored thereon that, responsive to execution on a computing device, causes the computing device to output a graphical user interface having a plurality of representations of friends that have been selected to permit output of status updates in a network feed of a social network service. One or more of the representations are representative of users of the social network service, respectively, and at least one of the representations is representative of a software agent that is configured to provide recommendations in the network feed.

In an implementation, a social network service is implemented via one or more computing devices. The social network service is configured to execute a plurality of software agents, each having one or more criteria that are usable to make recommendations and provide a user interface having an icon for each of the plurality of software agents. The icon is representative of the criteria of a respective software agent and selectable to add the respective software agent as a friend associated with a user's account in the social network service. The social network service is also configured to communicate the recommendations made by a selected software agent that is associated with the user's account in the social network service.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

A user may follow a variety of different content consumption modalities. For example, the user may consume a wide variety of different content, such as for different types of music (e.g., classical and rock), video (e.g., action and comedy), and so on. However, conventional techniques that were used to make content recommendations traditionally followed an "all or nothing" approach that did not address the different content-consumption modalities or give a user an opportunity to customize the approach used to make the recommendations.

Techniques are described to personify software agents that are configured to make recommendations. For example, the software agents may be personified to give human characteristics to the software agents, such as to mimic a target audience that is to receive the recommendations. In this way, a user may readily recognize a type of recommendations that may be expected from the personified software agent.

Additionally, the personified software agents may be provided in a user interface to be selectable as friends in a social network service. Continuing with the previous example, the recommendation experience may be implemented by anthropomorphizing the personified software agent into a friend that a user may add to a profile in the social network service. Therefore, the user may choose from multiple software agents to be added as a friend to the user's profile, with each agent having its own appearance and criteria that affect how recommendations are made. As previously described, the appearance may reflect the criteria used to make the recommendations.

Thus, the software agents, which each have their own personality, may recommend content to the user, make friend suggestions regarding other users of the social network service, and offer other information to the active user such as local concert dates or forum posts that the active user is likely to find interesting. The recommendations may then be output in a variety of ways, such as through inclusion in a network feed of the social network service as a status update along with status updates of human friends of the active user, via email, SMS text, and so on. Further discussion of the personification and recommendation techniques may be found in relation to the following figures.

In the following discussion, an example environment is first described that is operable to perform personification techniques. Example procedures are then described which may be employed by the example environment. However, it should be readily apparent that the example environment is not limited to performing the example techniques and the example techniques are not limited to performance in the example environment.

Example Environment

Figure 1:
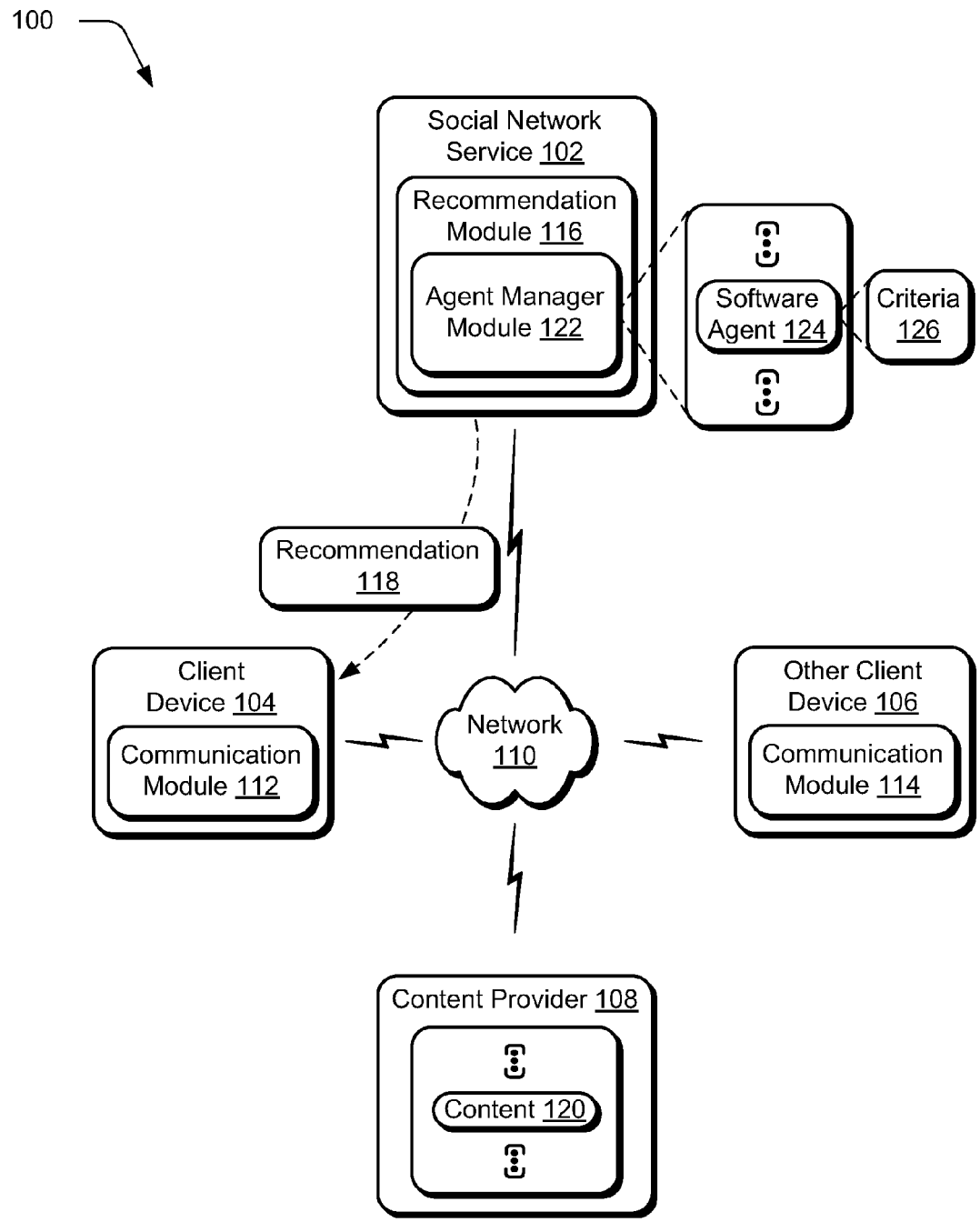
FIG. 1 is an illustration of an environment in an example implementation that is operable to perform personification techniques of software agents that are usable to make recommendations.

FIG. 1 is an illustration of an environment 100 in an example implementation that is operable to employ personification of software agent techniques. The illustrated environment 100 includes a social network service 102, a client device 104, another client device 106, and a content provider 108, each of which are communicatively coupled, one to another, over a network 110.

The client devices 104, 106 may be configured in a variety of ways. For example, the client devices 104, 106 may be configured as a computer that is capable of communicating over the network 110, such as a desktop computer, a mobile station, an entertainment appliance, a set-top box communicatively coupled to a display device, a wireless phone, a game console, and so forth. Thus, the client devices 104, 106 may range from full resource devices with substantial memory and processor resources (e.g., personal computers, game consoles) to a low-resource device with limited memory and/or processing resources (e.g., traditional set-top boxes, handheld game consoles). The client devices 104, 106 may also relate to an entity that operates the client devices 104, 106. In other words, client devices 104, 106 may describe logical clients that include software in the following discussion.

Although the network 110 is illustrated as the Internet, the network may assume a wide variety of configurations. For example, the network 110 may include a wide area network (WAN), a local area network (LAN), a wireless network, a public telephone network, an intranet, and so on. Further, although a single network 110 is shown, the network 110 may be configured to include multiple networks. For instance, the social network and the client devices 104, 106 may be communicatively coupled via the Internet. Additionally, both the client devices 104, 106 may be communicatively coupled via a local wireless network. A wide variety of other instances are also contemplated.

The client devices 104, 106 are each illustrated as including a respective communication module 112, 114. The communication modules 112, 114 are representative of functionality of the respective client devices 104, 106 to communicate via the network 110. For example, the communication modules 112, 114 may include browser functionality to interact with the social network service 102 via network 110.

The social network service 102 may support a variety of different functionality. For example, the social network service 102 may support communication of status updates between the client devices 104, 106 that have been specified as friends of each other. Additionally, the specified "friendship" of the social network service 102 may be used as a basis to permit sharing of photos, video, blogs, and so on. Thus, the social network service 102 may use the friend relationship as a permissioning technique to permit or restrict access to content associated with a user's account of the social network service 102.

For instance, the client device 102 may be associated with a user's account of the social network service 102. Through this user account, the client device 104 may be used to specify a friend, such as a user account of the social network service 102 that is accessible via the other client device 106. By doing this, the other client device 106 is permitted to access content associated the client device 104, such as content associated with an account of the social network service 102 of a user of the client device 104 that provided credentials to access the user account.

The social network service 102 is also illustrated as including a recommendation module 116 that is representative of functionality to make recommendations. For example, the recommendation module 116 may be used to make a recommendation 118 regarding content 120 that is available from a content provider 108 via the network 110. The recommendations 118 may also refer to content that is not available via the network 110, such as a live performance, content available from a traditional "bricks and mortar" store (e.g., a printed book), and so on. The recommendation 118 may be made a communicated to the client device 104 in a variety of ways.

In one example, the recommendation module 116 includes an agent manager module 122 that is representative of functionality to manage one or more software agents 124 that are configured to make the recommendation 118 based on one or more respective criteria 126. In this way, each of the software agents 124 may use different respective criteria to make the recommendation 118. It should be noted that for purposes of the following discussion a software agent 124 may be representative of one or more software agents 124 and therefore may be referenced in the following discussion in a singular (e.g., software agent 124) or plural (e.g., software agents 124) form. An example of making a recommendation may be found in relation to FIG. 2.

Generally, any of the functions described herein can be implemented using software, firmware, hardware (e.g., fixed logic circuitry), manual processing, or a combination of these implementations. The terms "module" and "functionality" as used herein generally represent software, firmware, hardware, or a combination thereof. In the case of a software implementation, the module or functionality represents program code that performs specified tasks when executed on a processor (e.g., CPU or CPUs). The program code can be stored in one or more computer readable memory devices, e.g., memory or other tangible media. The features of the personification techniques described below are platform-independent, meaning that the techniques may be implemented on a variety of commercial computing platforms having a variety of processors.

Figure 2:
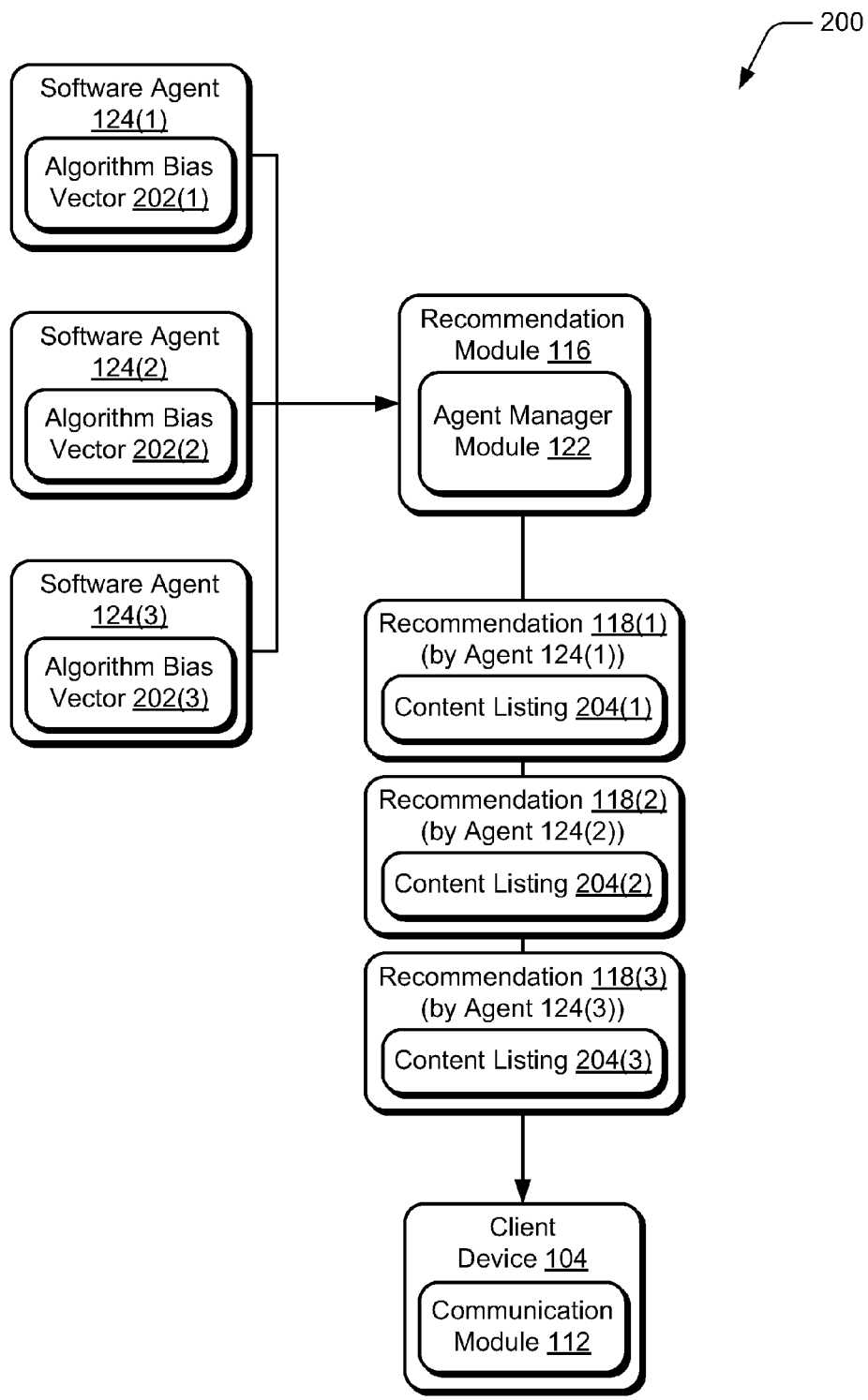
FIG. 2 is an illustration of a system in an example implementation showing execution of recommendation module to make recommendations to a client device of FIG. 1 using a plurality of software agents of FIG. 1.

FIG. 2 is an illustration of a system 200 in an example implementation showing execution of the recommendation module 116 to make recommendations to the client device 104 using a plurality of software agents 124 of FIG. 1. In FIG. 2, each of the software agents 124(1), 124(2), 124(3) correspond to a different respective modality for content consumption. For instance, the modalities may include "browse for new music," "browse for esoteric music," "listen to pop music," "browse for new music based on artists I already like," "watch funny videos," and so forth. It should be readily apparent that these modalities are not limited to the notions above in that each modality may be crafted as a personality for use on a social network service 102.

Criteria that may be used to make recommendations based on the modalities is then generated and included in the respective software agents, an example of which is illustrated as respective algorithm bias vectors 202(1), 202(2), 202(3) in FIG. 2. Through execution of the software agents 124(1)-124 (3), the agent manager module 112 may configure a plurality of recommendations 118(1), 118(2), 118(3) having content listings 204(1), 204(2), 204(3) to the client device 104. Selection of which software agents 124(1)-124(3) are employed to provide recommendations to the client device 104 may be performed in a variety of ways, an example of which may be found in relation to the following figure.

Figure 3:
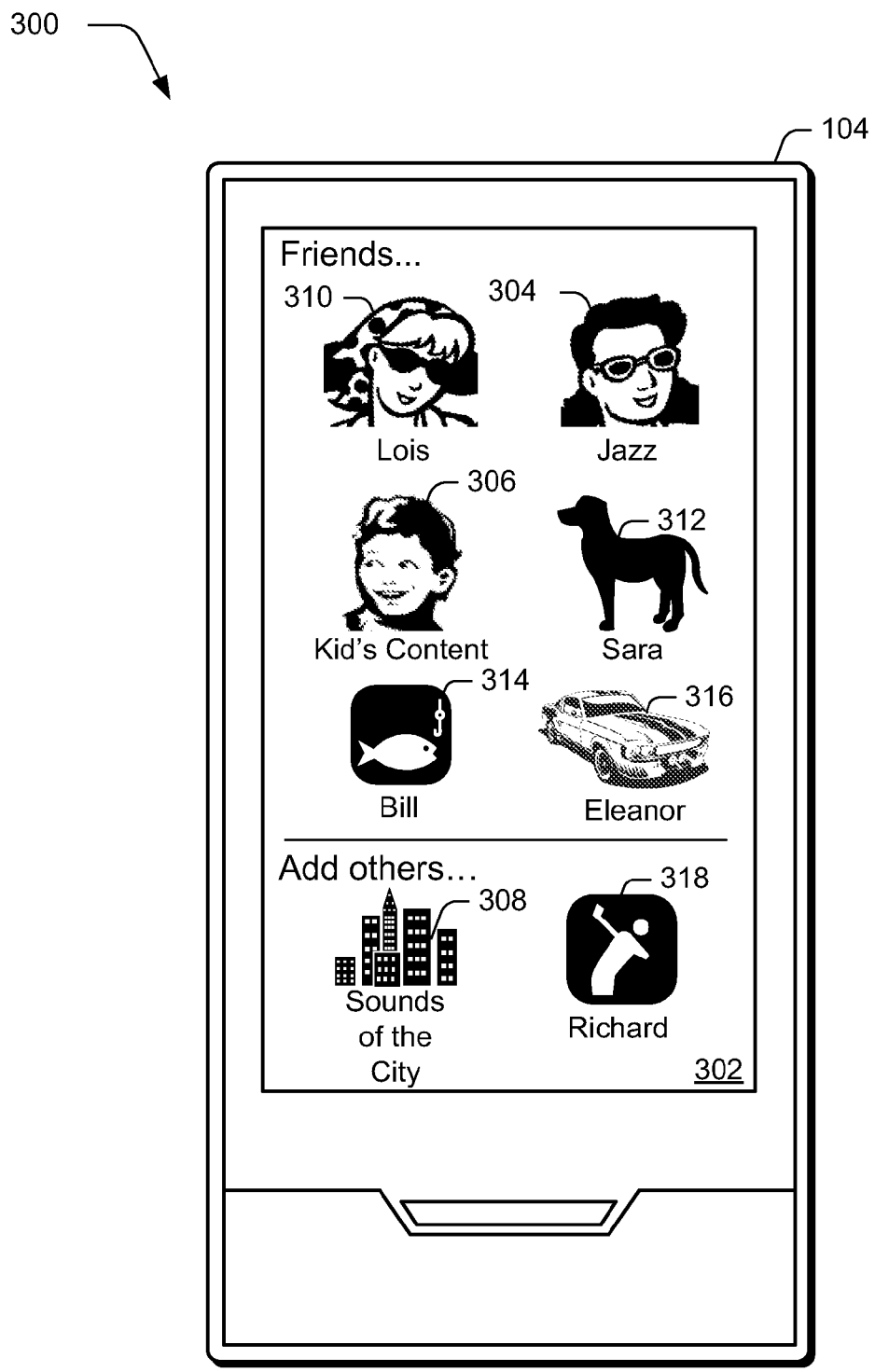
FIG. 3 is an illustration showing a client device of FIG. 1 that is configured as a portable music player that displays a user interface configured to select friends for a social network service.

FIG. 3 is an illustration showing the client device 104 of FIG. 1 configured as a portable music player that displays a user interface 302. In this example, the agent manager module 122 personifies software agents for representation in the user interface 302. For example, icons may be given human characteristics in accordance with the criteria that are used by the software agent that is represented in the user interface 302. In a first such instance, a software agent that is to be used to make recommendations regarding jazz music is represented by an icon 304 that shows a man wearing sunglasses. In another such instance, a software agent that is to be used to make recommendations regarding children's content is represented by an icon 306 of a child. Thus, in each of these examples the personification of the software agent represents a target audience of recommendations that are to be made by the represented agent. A variety of other examples of non-human characteristics are also contemplated, such as through an icon 306 of a city for "sounds of the city" that also represents the criteria used to make the recommendation but does not give it human characteristics.

In the illustrated example, the user interface 302 is configured to specify "friends" in the social network service 102. Therefore, the representations of the software agents (e.g., icons 304-308) are included with representations of other user accounts of the social network service 102. Illustrated examples of the other user accounts include an icon 310 for Lois, an icon 312 for Sara, an icon 314 for Bill, an icon 316 for Eleanor, and an icon 318 for Richard. Thus, in this example both software agents (e.g., software agents that correspond to icons 304, 306) and user accounts of other users of the social network service 102 (e.g., user accounts that correspond to icons 310-316) have been specified as friends in a user account used to output the user interface 302.

Thus, the user interface 302 may be used to specify which software agents and/or other users (through their associated user accounts) are used as a basis to make recommendations. A variety of different data may be provided to a user to be used as a basis to select the software agents beyond the personification of the software agent. For instance, the icons 304-308 may also be selectable to output a listing of criteria to be used to make the recommendation, and thus a user is not limited to reliance on an appearance of the representation, e.g., what is personified by the representation. Once selected, recommendations made by the software agents may be output in a variety of ways, an example of which may be found in relation to the following figure.

Figure 4:
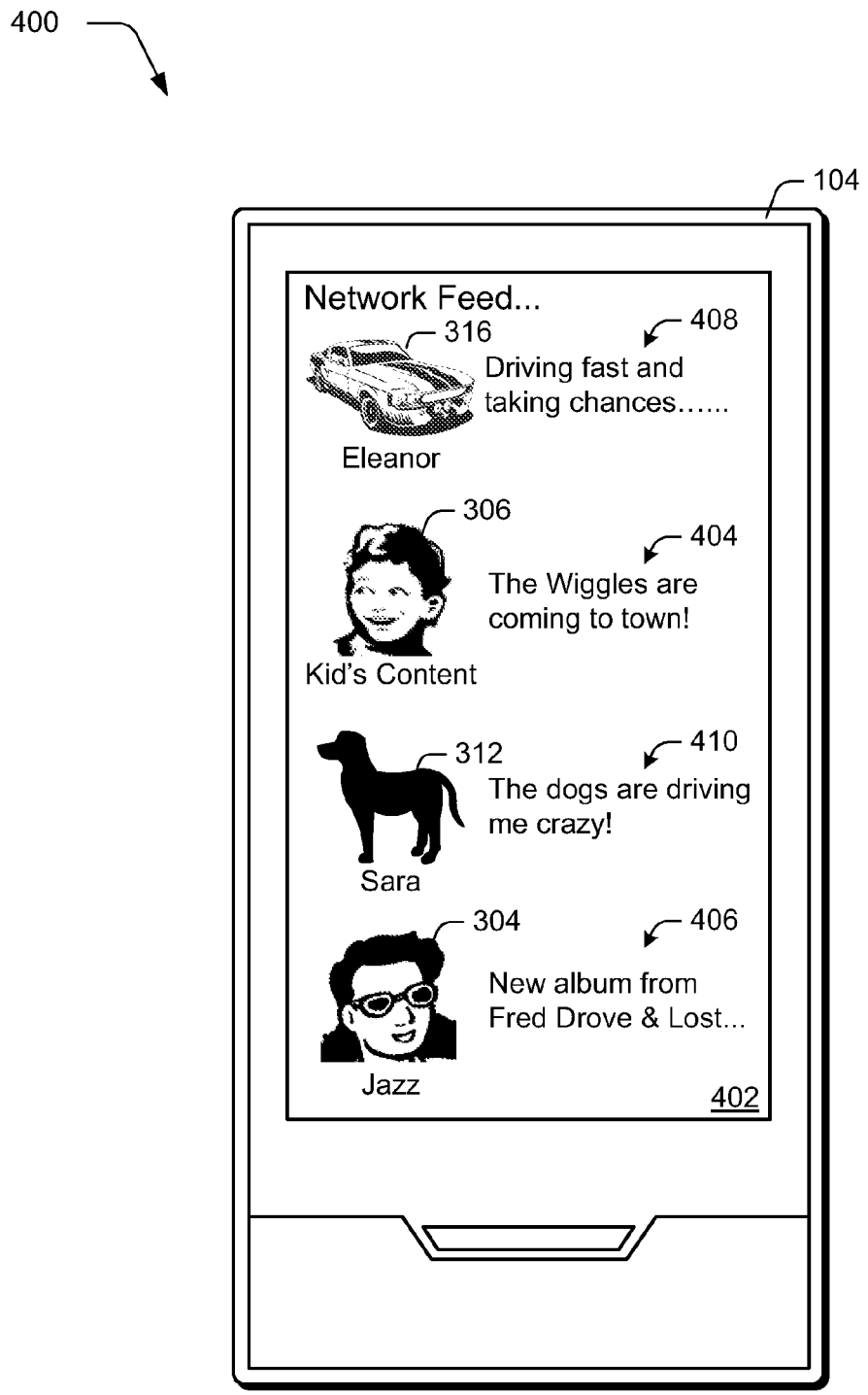
FIG. 4 is an illustration showing the client device of FIG. 3 as outputting a user interface that is configured as a network feed to include recommendations as status updates.

FIG. 4 illustrates the client device 104 of FIG. 3 as outputting a user interface 402 that is configured as a network feed to include recommendations as status updates. The user interface 402 includes a plurality of status updates 404, 406, 408, 410. Status updates 404, 406 include recommendations from represented software agents that were selected as friends. For instance, status update 404, which is illustrated in the user interface 402 next to the icon 306 that corresponds to the kids content software agent, refers to a live event that is coming to the user's area, e.g., "the wiggles are coming to town."

In another instance, status update 406 that is illustrated in the user interface 402 next to the icon 304 that corresponds to the jazz software agent refers to new content that is available in that genre. Thus, status updates 404, 406 are communicated via the user's account in a manner similar to status updates that correspond to other user accounts of the social network service 102, e.g., status updates 406, 408. Therefore, a user that views the user interface 402 may be provided with recommendations in a passive experience that is not likely to intrude with a user's interaction with the network feed.

Thus, as shown in relation to FIGS. 3 and 4, once the software agents are personified, the agents may be collected and displayed in a user interface, e.g., via a web page. A user of the social network service 102 may then have the option to view each profile as if it were a "real" user's profile (e.g., as corresponding to a user of the social network service 102) to display recently played content, favorite albums and videos, and so on. As shown in relation to FIG. 3, the user has the option to add each software agent to a social graph as a friend in a manner that "real" user accounts are added to the graph. Although the previous discussion described communication of recommendations via a network feed, recommendations may be communicated in a variety of different ways.

For example, a profile of the software agent may include a list of recommendations that are displayed whenever the user selects the represented software agent, e.g., by "pointing and clicking" on a representation. In cases where there is latency between the time the software agent is added to a user's account (e.g., made a "friend") and when personalized recommendations become available, a message may be displayed such as "I'm still working on your first delivery. Give me a while . . . " In another instance, the software agent may instead display example recommendations for the user until detailed recommendations are available. One example of this could be, "I am still working on your request. But, check out some of my favorites," and the software agent's "favorite media" are displayed in a list for the user to consume. After personalized recommendations are generated, the user may view the software agent profile page at any time to view, rate, download, and otherwise consume the recommended media.

The recommendations may also be directly communicated to the client device 104. For example, the software agent may be used to issue a periodic message to the user via his inbox in the computing device 104. This message may contain simple text such as "Hey, I found some new music and videos you might like. Check them out below," along with the list of recommendations. Again, this list may be composed of content as well as other information known to the software agent which the active user is likely to find interesting, such as new concert dates, new video games, or other data.

Additionally, the software agent may be represented as an active personality. Thus, it too may appear to consume content, such as to listen to tracks, watch videos, and so on. Thus, just as friends in the social graph may display their music listening activity, the software agents may also display their "favorites." This way, whenever the user looks at his friends' activity, the software agents' example content consumption may be displayed as well. A variety of other examples are also contemplated, further discussion of which may be found in relation to the following section Example Procedures The following discussion describes personification techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1, the system 200 of FIG. 2, and the client device 104 of FIGS. 3 and 4.

Figure 5:
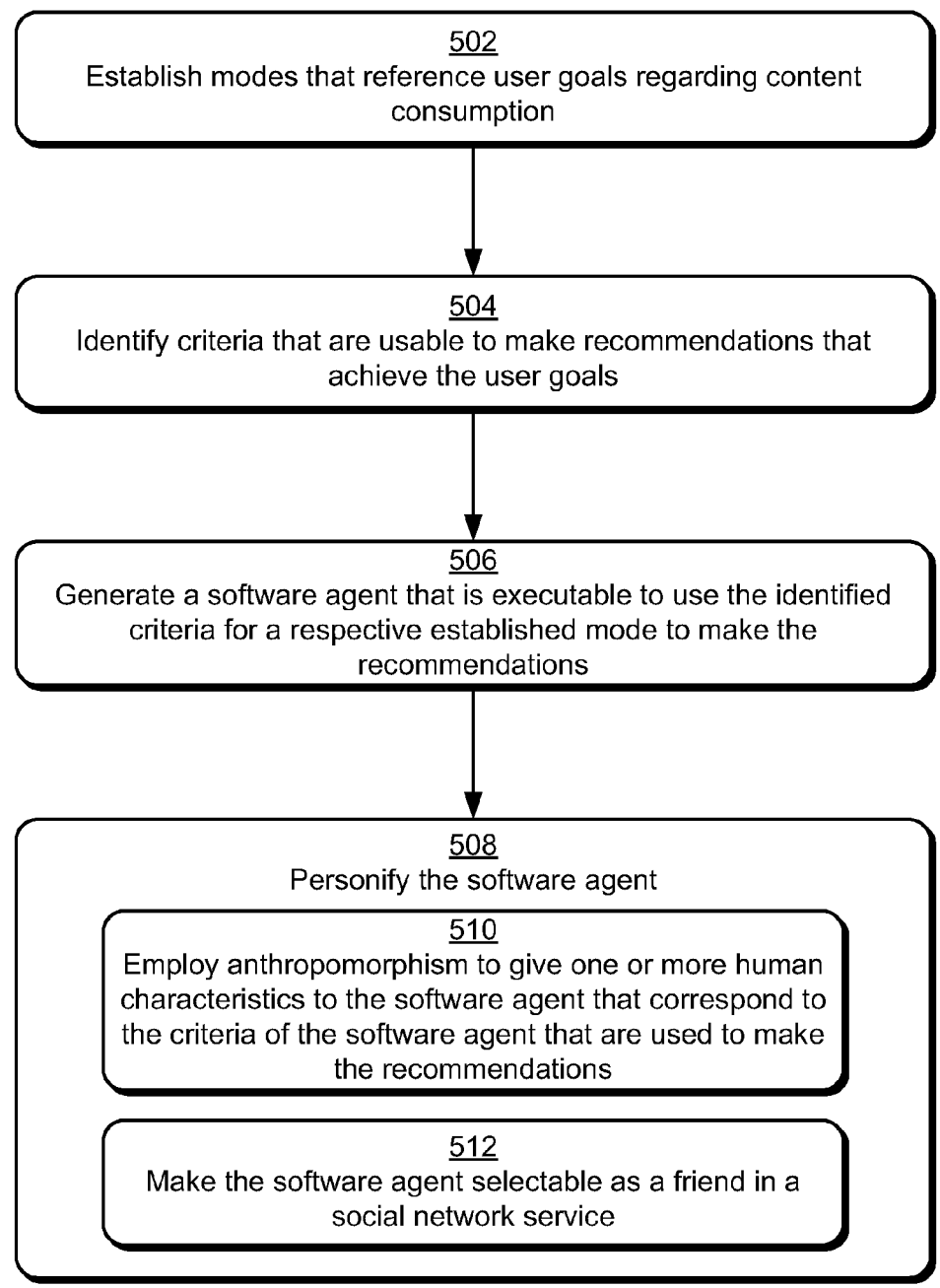
FIG. 5 is a flow diagram depicting a procedure in an example implementation in which a software agent that is generated for an established mode of content consumption is personified.

FIG. 5 depicts a procedure 500 in an example implementation in which a software agent that is generated for an established mode of content consumption is personified.

Modes that reference user goals regarding content consumption are established (block 502). For example, a user may wish to interact with a variety of different content that reflect different "moods" of the user, e.g., watch sports, listen to a radio at home versus in the car, and so on. Accordingly, content consumption modes may be established that reflect these moods.

Criteria are identified that are usable to make recommendations that achieve the user goals (block 504). Continuing with the previous example, the criteria may be set such that content is recommended that correspond to the modes, e.g., favorite teams, types of audio content (e.g., genres, artists, etc.), and so on.

A software agent is generated that is executable to use the identified criteria for a respective established mode to make the recommendations (block 506). For example, the software agent may be configured as an executable module that incorporates the identified criteria to make the recommendations based on metadata and other information associated with the content, such as what "type" of user typically enjoys the content.

The software agent is personified (block 508). For example, anthropomorphism may be employed to give one or more human characteristics to the software agent that corresponds to the criteria of the software agent that are used to make the recommendations (block 510). For instance, the software agent may be given human characteristics that correspond with an intended audience for recommendations made by the agent. Thus, users in the intended audience may readily identify with the software agent and choose it to make recommendations. In another example, the software agent is made selectable as a friend in a social network service (block 512). As shown in FIG. 3, for instance, the software agent may mimic a human friend in a social network service such that recommendations made by the software agent mimic recommendations made by friends of the user, further discussion of which may be found in relation to the following figure.

Figure 6:
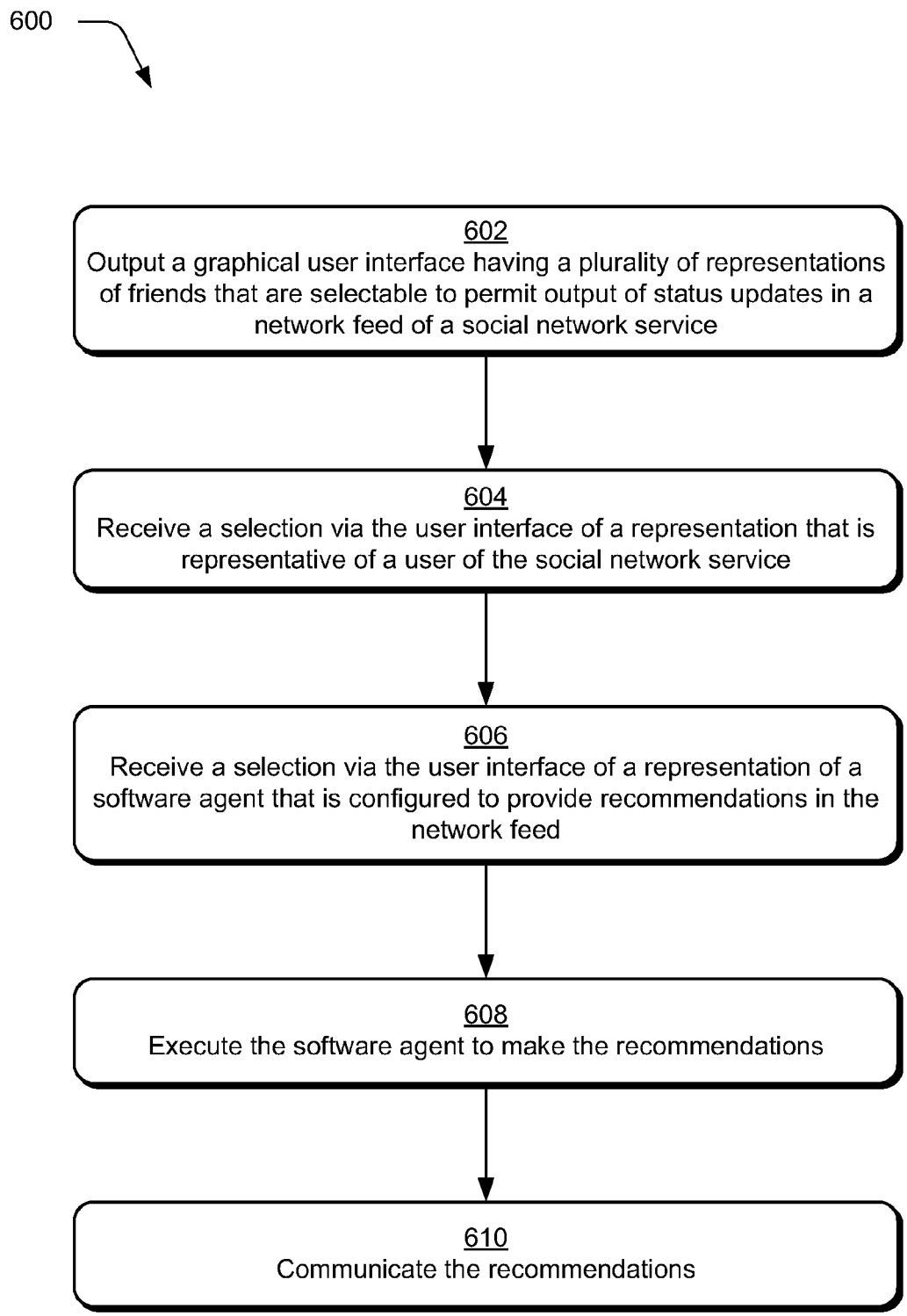
FIG. 6 is a flow diagram depicting a procedure in an example implementation in which recommendations are made by software agents that are selected via a social network service.

FIG. 6 depicts a procedure 600 in an example implementation in which a recommendations are made by software agents that are selected via a social network service. A graphical user interface is output having a plurality of representations of friends that are selectable to permit output of status updates in a network feed of a social network service (block 602). Continuing with the previous example, FIG. 3 shows a user interface 302 that includes representations of friends having user accounts in the social network service 102, i.e., human friends. Accordingly, a selection may be received via the user interface of a representation of a user of the social network service (block 604).

The user interface may also be configured to include representations of the software agents as users of the social network service 102. Therefore, a selection may be received via the user interface of a representation of a software agent that is configured to provide recommendations in the network feed (block 606). As previously described, this selection may be based on "how" the software agent is personified so that a user may readily determine the criteria that are likely to be used by the software agent to make the recommendations without actually having to view the actual criteria.

The software agent is executed to make the recommendations (block 608). This may be performed in a variety of ways. For example, the software agent may employ the criteria to look for content that is available via the network 110. A variety of other content may also be located, such as live events, books from a "bricks and mortar" store, and so on. The recommendations are then communicated (block 610), such as via a network feed provided by the social network service 102, a SMS text, email, and so on. A variety of other examples are also contemplated without departing from the spirit and scope thereof, such as to output one or more recommendations upon selection of a representation of a software agent.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
    personifying a plurality of software agents in a user interface to be selectable as friends in a social network service for inclusion with representations of one or more user accounts of the social network service that are selected as friends, each said software agent is executable to make one or more recommendations based on criteria of the software agent, respectively, and the personifying corresponding to a modality for content consumption crafted as a personality for use in the social network service; and
    communicating recommendations made by particular said software agents via user accounts of the social network service that have selected the particular said software agents as friends such that:
    the recommendations are communicated for inclusion a network feed that includes at least one status update from at least one said user account of the social network service that is selected as a friend; and
    at least one user account of the social network service that did not select the particular said software agents as friends do not receive the recommendations.

2. The method of claim 1, wherein the plurality of software agents are personified in a user interface that also include representations of user accounts of the social network service, the representations of the user accounts being selectable to add the user account as a friend in the social network service.

3. The method of claim 1, wherein the personifying is performed using anthropomorphism to give one or more human characteristics to the software agent that correspond to the criteria of the software agent that are used to make the one or more recommendations.

4. The method of claim 1, wherein the personifying is performed using an icon that has the one or more human characteristics.

5. The method of claim 1, wherein at least one of the personified software agents are selectable to view the criteria to be used to make the recommendations.

6. The method of claim 1, wherein at least one said recommendation specifies particular content.

7. The method of claim 1, wherein at least one said recommendation specifies a live event.

8. The method of claim 1, wherein at least one said recommendation suggests another user account to be specified as a friend of the user account.

9. The method of claim 1, wherein at least one said recommendation is made using the criteria of a respective said software agent and one or more criteria of a human user of the social network service that is specified as a friend of the user account.

10. A system comprising one or more computing devices configured to implement a social network service and perform one or more operations comprising:

executing a plurality of software agents, each personified with human characteristics and having one or more criteria that are usable to make recommendations, the recommendations affected by both the human characteristics in which the software agent is personified and the one or more criteria;

providing a user interface having an icon for each of the plurality of software agents, the icon representative of the criteria of a respective said software agent and selectable to add the respective said software agent as a friend associated with a user's account in the social network service; and communicatiing the recommendations made by respective ones of the plurality of selected said software agents that are friends with the user's account in the social network service for output in a network feed of the user's account as a plurality of status updates from the plurality of selected said software agents along with a status update from another user account that is not provided by one of the software agents.

11. The system of claim 10, wherein at least one said icon personifies one or more human characteristics that correspond to the criteria of the software agent that are used to make the one or more recommendations.

12. The system of claim 11, wherein the personification is performed using an icon that has the one or more human characteristics.

13. The system of claim 10, wherein the recommendations are communicated in a network feed provided by the social network service along with one or more status updates.

14. A computing device comprising one or more modules implemented at least partially in hardware, the one or more modules configured to perform operations comprising:

personifying a plurality of software agents in a user interface to be selectable as friends in a social network service for inclusion with representations of one or more user accounts of the social network service that are selected as friends, each said software agent is executable to make one or more recommendations based on criteria of the software agent, respectively, and the personifying corresponding to a modality for content consumption crafted as a personality for use in the social network service; and communicating recommendations made by particular said software agents via user accounts of the social network service that have selected the particular said software agents as friends such that:

the recommendations are communicated for inclusion a network feed that includes at least one status update from at least one said user account of the social network service that is selected as a friend; and at least one user account of the social network service that did not select the particular said software agents as friends do not receive the recommendations.

15. The computing device of claim 14, wherein the plurality of software agents are personified in a user interface that also include representations of user accounts of the social network service, the representations of the user accounts being selectable to add the user account as a friend in the social network service.

16. The computing device of claim 14, wherein the personifying is performed using anthropomorphism to give one or more human characteristics to the software agent that correspond to the criteria of the software agent that are used to make the one or more recommendations.

17. The computing device of claim 14, wherein the personifying is performed using an icon that has the one or more human characteristics.

18. The computing device of claim 14, wherein at least one of the personified software agents are selectable to view the criteria to be used to make the recommendations.

19. The computing device of claim 14, wherein at least one said recommendation specifies particular content.

20. The computing device of claim 14, wherein at least one said recommendation specifies a live event.

* * * * *